United States Patent [19]
Holm et al.

[11] 4,137,335
[45] Jan. 30, 1979

[54] RECOVERY OF FAT AND MEAT MEAL FROM ANIMAL RAW MATERIAL

[75] Inventors: Leif G. Holm, Roskilde; Birgitte N. Korremann-Nielsen, Vanlose Copenhagen, both of Denmark

[73] Assignee: Alfa-Laval AB, Tumba, Sweden

[21] Appl. No.: 462,134

[22] Filed: Apr. 18, 1974

[30] Foreign Application Priority Data

Apr. 19, 1973 [SE] Sweden ............................... 7305613

[51] Int. Cl.$^2$ ............................................. A23C 12/02
[52] U.S. Cl. ................................ 426/417; 260/112 R; 260/412.6; 426/472; 426/480
[58] Field of Search .................... 260/412.6, 112 R; 426/417, 472, 480, 807, 635

[56] References Cited

U.S. PATENT DOCUMENTS

| 2,193,871 | 3/1940 | Hanno | 426/417 |
| 2,277,718 | 3/1942 | Sanders | 260/112 R |
| 2,328,361 | 8/1943 | Sanders | 210/56 X |
| 2,468,636 | 4/1949 | Napier | 260/412.6 |
| 2,534,640 | 12/1950 | Valen | 426/417 |
| 2,888,449 | 5/1959 | Borck | 260/112 |
| 3,282,972 | 11/1966 | Merlis | 260/412.6 |
| 3,352,841 | 11/1967 | Lyon | 426/417 X |
| 3,586,515 | 6/1971 | Anderson | 426/417 |
| 3,780,075 | 12/1973 | Dufault et al. | 260/412.6 |

FOREIGN PATENT DOCUMENTS

| 325468 | 6/1970 | Sweden | 426/417 |
| 612554 | 11/1948 | United Kingdom | 426/417 |

Primary Examiner—Frank Sever
Attorney, Agent, or Firm—Cyrus S. Hapgood

[57] ABSTRACT

Animal raw material is boiled at least mainly by indirect heating and then divided into stick water and solids, the solids being separately dried to form a first meat meal fraction. The stick water, preferably after separating a sludge component and a fat component therefrom, is concentrated by evaporation and then divided into a sludge phase and a fat phase, the sludge phase being dried to form a second meat meal fraction.

2 Claims, No Drawings

RECOVERY OF FAT AND MEAT MEAL FROM ANIMAL RAW MATERIAL

The present invention relates to a method for recovering fat and meat meal from animal raw material, the latter being boiled completely or mainly by indirect heating and the boiled material being divided into glue or stick water and solids. Such a method is disclosed in Swedish patent specification No. 325,468.

The principal object of the present invention is to provide a method for the production of a meat meal having an increased protein percentage and at the same time a meat meal having a reduced protein percentage. The meat meal with the high protein percentage has proved to have a constant protein percentage. For this reason repeated analyses for determining the protein percentage of the product will be superfluous, while the meat meal with the low protein percentage has proved to have a varying protein percentage depending on the quantity of bone present in the raw material. The meat meal with the high protein percentage has a high selling price due to its high feed value, in that the content of digestible protein is appreciable and the amino acid distribution in the meal is particularly suitable. The meat meal with the low protein percentage can be mixed with blood meal or the like so that it too can serve as feed. The fat on the other hand is disposed for technical use.

The method according to the invention is characterized in that the solids recovered by dividing the boiled material are dried separately, thus forming a first meat meal fraction with a low protein percentage, and that the glue or stick water is concentrated by evaporation and divided into a sludge phase and a fat phase, whereupon the sludge phase is dried, thus forming a second meat meal fraction with a high protein percentage.

The high percentages of fat and sludge in the glue or stick water cause difficulties in the evaporation of the glue or stick water. For this reason, and according to an additional feature of the invention, the glue or stick water is separated prior to the evaporation into a sludge phase, a water phase and a fat phase, whereupon the water phase is subjected to the evaporation. The sludge phase thus obtained is dried, preferably together with the aforementioned sludge phase, a meat meal with a high protein percentage being thereby obtained.

The fat phase or the fat phases recovered according to the invention are freed from additional sludge, the latter, owing to its fat content, being supplied to the boiled material prior to its division into glue or stick water and solids.

Typical examples of meat meal fractions recovered according to the invention are the following ones, in which the percentages are approximate values stated in % by weight:

MEAT MEAL WITH A LOW PROTEIN PERCENTAGE

The protein percentage is 40%, calculated as raw protein.

The protein percentage is 37%, calculated as pure protein.

The protein percentage is 34%, calculated as digestible protein.

The fat percentage is 5%.

The water percentage is 10%.

MEAT MEAL WITH A HIGH PROTEIN PERCENTAGE

The protein percentage is 66%, calculated as raw protein.

The protein percentage is 49%, calculated as pure protein.

The protein percentage is 47%, calculated as digestible protein.

The fat percentage is 11%.

The water percentage is 10%.

The invention is described more in detail below, reference being made to the accompanying drawing in which the single illustration is a flow diagram of a system operating according to the present method.

In the drawing, an indirectly heated boiler 1 is fed with animal carcases or slaughter-house offal, as indicated by an arrow 2. During the boiling, a certain amount of steam escapes. The boiled material is fed through a pipeline 3 to a centrifuge 4 of the well-known type provided with a screw conveyor. The solids separated in the centrifuge 4 are fed from the centrifuge by the screw conveyor and fed further through a pipeline 5 to a drier 6, heated indirectly by steam. As indicated by an arrow 7, a dried meat meal discharges from the drier with a relatively low protein percentage. The glue water obtained in the centrifuge 4 discharges via the usual overflow outlet and is fed through a pipeline 8 to an additional centrifuge 9, where the glue water is divided into a sludge phase, a water phase and a fat phase. The sludge phase is fed through a pipeline 10 to a second drier 11, heated indirectly by steam. The water phase is fed through a pipeline 12 to an evaporator 13, and the fat phase is fed through a pipeline 14 to a centrifuge 15. An additional quantity of steam escapes in the evaporator 13, and the glue water thus concentrated is fed through a pipeline 16 to another centrifuge 17, where the glue water is divided into a sludge phase and a fat phase. The sludge phase is fed through a pipeline 18 to the drier 11, where the sludge phases thus combined are dried. A meat meal leaves the drier 11, as indicated by an arrow 19. This meat meal has a high protein percentage. The fat phase leaving the centrifuge 17 is fed through a pipeline 20 to the centrifuge 15, where the combined fat phases are freed from an additional quantity of sludge, which is led back to the boiler inlet through a pipeline 21. Clean-separated fat leaves the centrifuge 15, as indicated by an arrow 22.

The invention is illustrated further by the following example of an embodiment, quantities being stated as kg/hour and percentages as % by weight.

1000 kg of raw material, consisting of slaughter-house offal and animal carcases and containing 60% of water, 18% of fat and 22% of another dry substance, are boiled in the boiler 1 by indirect heating, 100 kg of steam escaping. The boiled mass, mixed with 36 kg of sludge returned through the pipeline 21, is separated in the centrifuge 4 into two phases, namely, 270 kg of a solids phase containing 51% of water and 3% of fat, and 666 kg of a liquid phase containing 57% of water, 26% of fat and 17% of dry substance. The solids are fed to the drier 6, where 147 kg of meat meal with 40% of raw protein, 5% of fat, 10% of water and a high percentage of bone material are obtained.

The liquid phase from centrifuge 4 is separated in the centrifuge 9 into three phases, namely, 148 kg of fat (with 11% of water and 1% of dry substance), 428 kg of glue water (72% of water, 9% of fat and 19% of dry substance) and 90 kg of sludge (64% of water, 9% of fat and 27% of dry substance). The glue water is concentrated in the evaporator 13 and leaves the latter in a quantity of 181 kg. The concentrated glue water, which consists of 33% of water, 21% of fat and 46% of dry substance, is separated in the centrifuge 17 into 46 kg of fat (with 30% of water together with dry substance) and 135 kg of sludge (42% of water, 5% of fat and 53% of dry substance). The sludge is fed to the drier 11. The fat is fed, together with the fat from the centrifuge 9, to the centrifuge 15, i.e., a total of 194 kg of fat (with 10% of water and 6% of dry substance). From the centrifuge 15 there are obtained 158 kg of technical fat with less than 0.1% of water and 36 kg of sludge (53% of water and 11% of fat). The sludge is returned to the process through the pipeline 21, as previously stated.

The sludge from the centrifuge 9 is fed directly to the drier 11, which receives a total of 225 kg of sludge. The latter is dried to provide 119 kg of meat meal with 66% of raw protein, 11% of fat, 10% of water and a low percentage of bone material.

In the following claims, it will be understood that both glue and stick water are included in the expression "stick water".

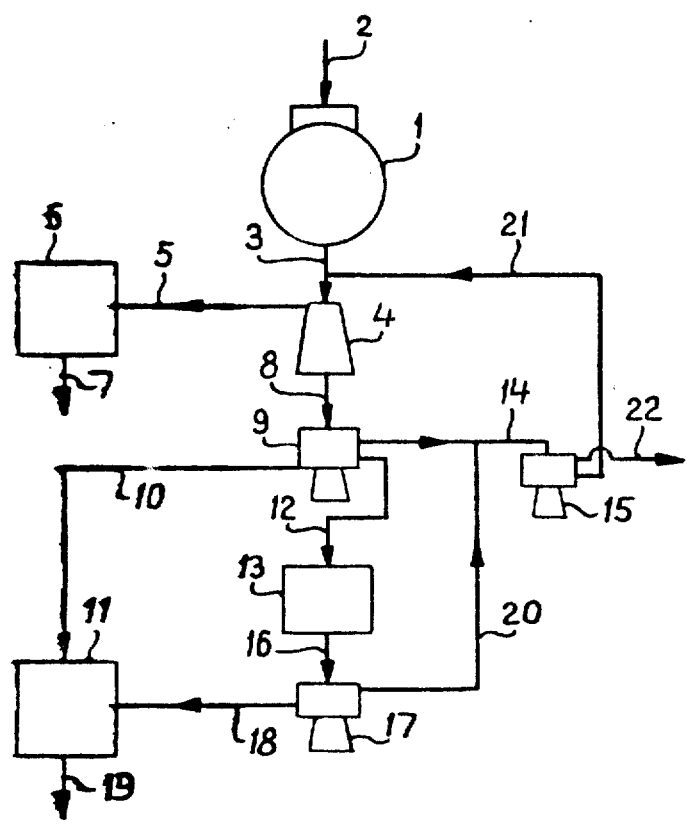

We claim:

1. A method for recovering fat and meat meal from animal raw material, which comprises boiling the raw material at least mainly by indirect heating, dividing the boiled material into stick water and solids, separately drying said solids to form a first meat meal fraction with a low percentage of protein, separating said stick water into a sludge phase, a stick water phase poor in fat and a fat phase, concentrating said stick water phase by evaporation, dividing the concentrated stick water phase into a sludge phase and a fat phase, and drying the two sludge phases together to form a second meat meal fraction with a high percentage of protein.

2. The method of claim 1, which comprises also separating additional sludge from at least one of said fat phases, and returning said additional sludge to said boiled material prior to said dividing of the boiled material.

* * * * *

UNITED STATES PATENT AND TRADEMARK OFFICE
CERTIFICATE OF CORRECTION

PATENT NO. : 4,137,335

DATED : January 30, 1979

INVENTOR(S) : Leif G. Holm, et al

It is certified that error appears in the above—identified patent and that said Letters Patent is hereby corrected as shown below:

The attached drawing figure should be inserted as part of the above-identified patent.

On the title page, immediately following the Abstract, "No Drawings" should read -- 1 Drawing Figure --.

Signed and Sealed this

Thirtieth Day of December 1980

[SEAL]

Attest:

Attesting Officer

SIDNEY A. DIAMOND

Commissioner of Patents and Trademarks